United States Patent

[11] 3,578,053

[72] Inventor Paul E. Milliken
    Massillon, Ohio
[21] Appl. No. 855,540
[22] Filed Sept. 5, 1969
[45] Patented May 11, 1971
[73] Assignee The Goodyear Tire & Rubber Company
    Akron, Ohio

[54] TIRE STUD
    12 Claims, 9 Drawing Figs.
[52] U.S. Cl. .................................................. 152/210
[51] Int. Cl. ................................................ B60c 11/16
[50] Field of Search ........................................... 152/210

[56] References Cited
    UNITED STATES PATENTS
    984,500   2/1911   Stimpson ..................... 152/210
    3,179,147  4/1965   Edsmar ........................ 152/210
    3,407,860 10/1968   Mossberg ..................... 152/210

Primary Examiner—James B. Marbert
Attorneys—F. W. Brunner and Paul E. Milliken

ABSTRACT: A tire stud having increased traction characteristics due to increased edge contact with the road achieved by the cross-sectional contour of the traction portion of the stud. In one embodiment, the traction portion is X-shaped in cross section and in another embodiment, the traction portion is L-shaped in cross section. The stud may be inserted directly in a hole previously molded in a tire tread or it can be encased in an elastomeric plug which is vulcanized to the stud and then the plug with the stud therein is placed within a premolded hole in the tire tread. To more firmly secure the elastomeric plug in the hole, adhesive may be applied.

PATENTED MAY 11 1971
3,578,053
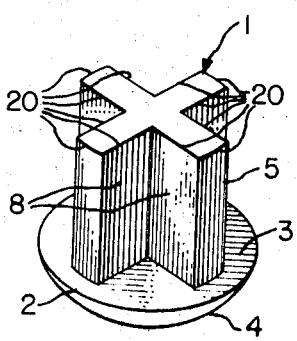
FIG. 1
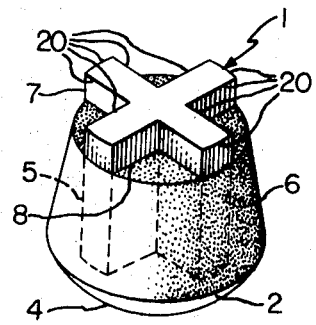
FIG. 2
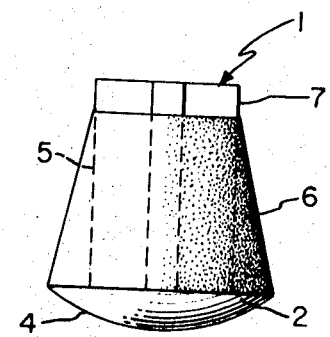
FIG. 3
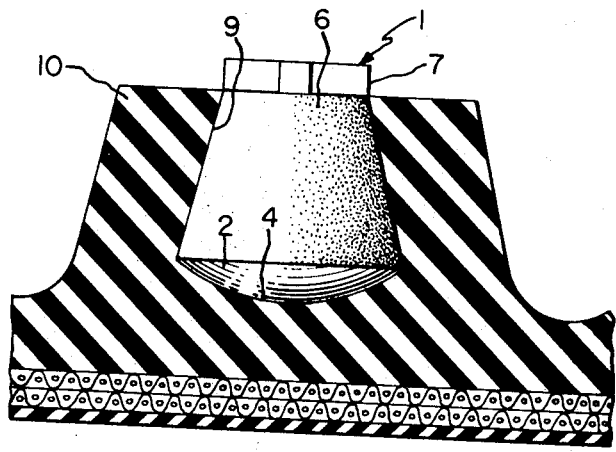
FIG. 4
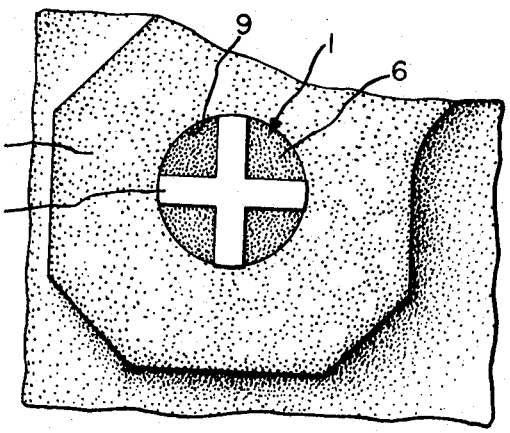
FIG. 5
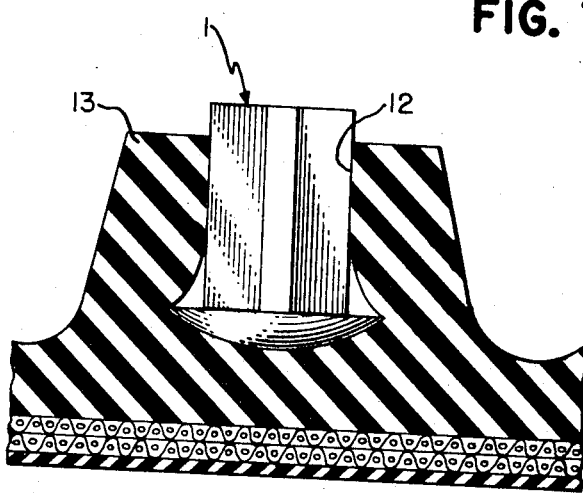
FIG. 6
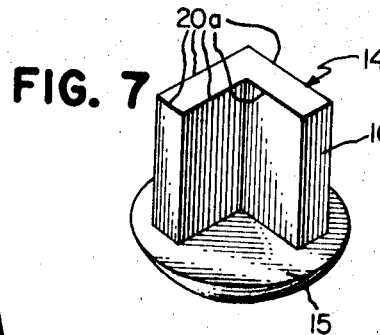
FIG. 7
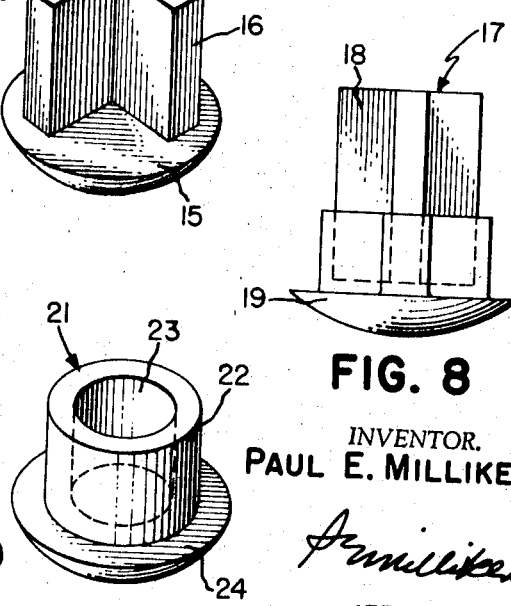
FIG. 8
FIG. 9
INVENTOR.
PAUL E. MILLIKEN
ATTORNEY

TIRE STUD

This invention relates to a tire stud having increased traction characteristics due to the cross-sectional contour of the traction portion of the stud.

BACKGROUND OF THE INVENTION

Tire studs have been used for many years to provide added traction for automotive vehicles when traveling on ice and snow. Most of the prior art studs which have been used in the past have hard wear-resistant tips made of tungsten carbide or other suitable wear-resistant materials. These hardened tips have normally been made round in cross section and have been approximately 0.110 inch in diameter. Typical examples of such round studs may be seen in many patents, such as U.S. Pat. No. 3,400,443 issued to W. P. Miller II, U.S. Pat. No. 3,403,435 issued to L. A. Holder, and U.S. Pat. No. 3,404,718 issued to C. J. Smith. Many other patents too numerous to mention may also be found in the prior art showing various types of round tire studs.

OBJECTS OF THE INVENTION

It is a primary object of this invention to provide a tire stud having increased traction characteristics due to the cross-sectional contour of the stud which presents an increased edge contact between the traction portion of the stud and the road with which it comes in contact.

Another object of this invention is to provide a tire stud which may be more firmly secured in the tire tread and will be less likely to tilt or cock in the hole in which it is inserted or even fly out of the hole due to hard driving for long mileages.

These and other objects of the invention will become more fully apparent as the description proceeds in the following specification and the accompanying drawings.

BRIEF DESCRIPTION OF THE DRAWINGS

FIG. 1 is a perspective view of a tire stud of one embodiment of the invention;

FIG. 2 is a perspective view of the stud shown in FIG. 1 encapsulated in a rubber plug;

FIG. 3 is a side elevational view of the encapsulated stud shown in FIG. 2;

FIG. 4 is a fragmentary cross-sectional view through a portion of a tire tread showing the encapsulated stud of FIGS. 2 and 3 positioned in a hole in the tire tread;

FIG. 5 is a fragmentary plan view illustrating the embodiment shown in FIG. 4;

FIG. 6 is a fragmentary cross-sectional view showing a tire stud similar to that illustrated in FIG. 1 positioned directly in a hole in the tire tread;

FIG. 7 shows another embodiment of the tire stud of the invention;

FIG. 8 shows still another embodiment of the invention; and

FIG. 9 shows another embodiment of the invention.

DESCRIPTION OF PREFERRED EMBODIMENTS

Referring now to FIG. 1, a tire stud is illustrated generally by the numeral 1. The stud 1 has a round head 2 having a flat side 3 and a convexly curved side 4. A body portion of X-shaped cross section extends from the flat side 3 of the head 2 and is substantially perpendicular thereto. The stud 1, for the purpose of illustrating the invention, is made preferably of a hard metal such as tungsten carbide or the like and may be formed by any suitable metal-working method. The stud may be sintered as an integral unit or the head and body portions may be made separately and attached together.

FIGS. 2 and 3 show the stud 1 encapsulated in a frustoconical rubber plug 6 which is vulcanized around the body portion 5 of the stud. A small protruding portion 7 of the body portion 5 extends beyond the plug 6. The convexly curved side 4 of the head 2, as shown, is not covered by a rubber plug. Because of the manner in which the plug 6 surrounds the body portion 5 and because of the manner in which the head 2 covers the entire lower portion of the plug 6, the body portion 5 is held in the plug 6 not only by the adhesion between side surfaces 8 of the body portion and the contacting portions of the plug 6, but by the contact of the flat side 3 of the head 2 against the bottom of the plug 6. In other words, when the plug 6 with the stud 1 vulcanized therein is positioned in a hole 9 in a tire tread 10, as shown in FIG. 4, the head 2 will prevent the stud 1 from pulling out of the plug 6. The tapered walls of the plug 6 match the tapered contour of the hole 9 and prevent the plug 6 from pulling out of the hole 9. To further assure that the plug 6 remains in the hole, adhesive may be applied between the plug and the hole to more securely fasten it therein.

As may be seen in FIG. 5, an enlarged portion 11 is normally provided in one of the lugs of the tire tread to provide sufficient strength for supporting the plug 6 in the hole 9.

Referring now to FIG. 6 of the drawings, the stud 1 is shown inserted directly in a hole 12 in a tire tread 13. In this embodiment of the invention, the stud is not encapsulated in a rubber plug prior to insertion in the tire tread.

FIG. 7 shows a modified stud 14 having a round head 15 similar to the head 2 shown in FIG. 1 but having an L-shaped body portion 16 instead of the X-shaped body portion 5 as shown in FIG. 1.

FIG. 8 shows an embodiment in which a stud 17 is made in two parts with an X-shaped body portion 18 similar to the body portion 5 of FIG. 1 attached to a head 19 made of different material than the body 18. Various modifications may be made in the manner of fastening together the head and body portion and in the contour of the head and body portion without departing from the scope of the invention. Regardless of whether the X-shaped body portion or the L-shaped body portion is used, these configurations will provide greater traction than conventional studs due to the increased edge contact with the road provided by edges 20 shown in FIG. 1 and edges 20a shown in FIG. 7. As a typical example of the length of such edges, each individual edge may be made at least 0.110 inch in length, which is approximately the same as the diameter of the typical round tire stud. For additional traction it may be desirable to make at least part of the edges longer than 0.110 inch. Since the stud 1 shown in FIG. 1 has 12 of the edges 20, at least half of which will be in contact with the road, it may be readily observed that much greater edge contact is being provided. Although the embodiment shown in FIG. 1 provides the optimum length of edge contact with the road for the amount of material used in the body portion of the stud, the L-shaped embodiment of FIG. 7 may sometimes be desirable in certain tire treads for certain specific purposes. It may sometimes be desirable to use studs with other cross-sectional contours such as a U-shape, an H-shape or other shapes having at least a pair of substantially parallel linear edges. In some instances it may be desirable to use a stud of round tubular shape such as the stud 21 shown in FIG. 9 which has a hollow body portion 22 with a centrally located axial hole 23 therein and a head 24. The body 22 provides two concentric lineal edges 25 for contact with the road. A hollow rectangular-shaped stud may also be used in some instances. So long as the stud has longer lineal edges which contact the road than are present in the conventional round stud with a solid cross section, at least part of the advantages of the invention will be achieved. By having part of the edges substantially at right angles to the other edges as shown in FIGS. 1 through 8, this provides the advantage of giving both circumferential and lateral traction regardless of how the edges are positioned with respect to the tire tread. This means that the stud need not be inserted with the edges running in any particular direction in order to provide the most effective traction. Other modifications than those illustrated in the accompanying drawings may be made without departing from the invention.

I claim:

1. A traction stud for a tire comprising:
   A. a head; and
   B. a body extending radially outwardly from the head when the stud is installed in the tread portion of a tire;

1. at least part of said body being a traction portion made of hardened wear-resistant material,
2. the traction portion having a transverse cross-sectional contour which provides at least a pair of substantially parallel linear edges for contact with the road surface at the radially outer end of the stud,
3. at least part of the body of the stud being encapsulated in an elastomeric plug which is vulcanized with the stud therein prior to insertion in the tread of a tire.

2. A traction stud as claimed in claim 1 wherein the traction portion has an X-shaped cross-sectional contour.

3. A traction stud as claimed in claim 1 wherein the traction portion has an L-shaped cross-sectional contour.

4. A traction stud as claimed in claim 1 wherein the traction portion is a hollow round tubular member.

5. A traction stud as claimed in claim 1 wherein the plug is tapered from a large dimension at the radially inner end to a smaller dimension at the radially outer end.

6. A traction stud as claimed in claim 1 wherein the elastomeric plug is secured in a premolded hole in the tire tread by means of an adhesive.

7. A traction stud as claimed in claim 1 wherein the entire body portion and head of the stud is formed from the same material.

8. A traction stud for a tire comprising:
  A. a head to be positioned in the bottom of a radial hole in a tire tread;
  B. a body portion integral therewith and extending radially outwardly from the head when the stud is positioned in the tire tread;
  1. both the head and the body portion being made of hardened wear-resistant material,
  2. the outer end of the body portion presenting a plurality of straight linear edges for contact with the road surface.

9. A traction stud as claimed in claim 8 wherein part of the linear edges are inclined at an angle to the rest of the linear edges.

10. A traction stud as claimed in claim 8 wherein the traction portion has an X-shaped cross-sectional contour.

11. A traction stud as claimed in claim 8 wherein the traction portion has an L-shaped cross-sectional contour.

12. A traction stud as claimed in claim 8 wherein the stud is encapsulated in an elastomeric plug which is vulcanized with the stud therein prior to insertion in the tread of a tire.